United States Patent
Gatherer et al.

(10) Patent No.: US 6,252,911 B1
(45) Date of Patent: Jun. 26, 2001

(54) TRELLIS SHAPING FOR PCM MODEMS

(75) Inventors: Alan Gatherer, Richardson; Murtaza Ali, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/096,062

(22) Filed: Jun. 11, 1998

Related U.S. Application Data

(60) Provisional application No. 60/049,312, filed on Jun. 11, 1997.

(51) Int. Cl.[7] .............................. H04L 5/12; H04L 23/02
(52) U.S. Cl. ........................ 375/265; 375/262; 341/94
(58) Field of Search ................................. 375/242, 254, 375/259, 262, 265, 285, 222; 341/94; 704/242; 714/795

(56) References Cited

U.S. PATENT DOCUMENTS

| | | | | |
|---|---|---|---|---|
| 4,527,279 | * | 7/1985 | Yasuda et al. | 375/365 |
| 4,578,800 | * | 3/1986 | Yasuda et al. | 375/354 |
| 5,073,940 | * | 12/1991 | Zinser et al. | 704/226 |
| 5,263,051 | * | 11/1993 | Eyuboglu | 375/254 |
| 5,289,501 | * | 2/1994 | Seshadri et al. | 375/286 |
| 5,321,725 | * | 6/1994 | Paik et al. | 375/265 |
| 5,388,124 | * | 2/1995 | Laroia et al. | 375/286 |
| 5,418,531 | * | 5/1995 | Laroia | 341/94 |
| 5,428,646 | * | 6/1995 | Eyuboglu | 375/354 |
| 5,446,758 | * | 8/1995 | Eyuboglu | 375/259 |
| 5,455,839 | * | 10/1995 | Eyuboglu | 375/265 |
| 5,488,633 | * | 1/1996 | Laroia | 375/262 |
| 5,511,081 | * | 4/1996 | Hagenauer | 714/795 |
| 5,535,228 | * | 7/1996 | Dong et al. | 714/800 |
| 5,673,291 | * | 9/1997 | Dent | 375/262 |
| 5,710,790 | * | 1/1998 | Herzberg et al. | 375/219 |

* cited by examiner

*Primary Examiner*—Stephen Chin
*Assistant Examiner*—Lenny Jiang
(74) *Attorney, Agent, or Firm*—Warren L. Franz; Wade James Brady, III; Frederick J. Telecky, Jr.

(57) ABSTRACT

A trellis shaping method is described that may be used for suppressing DC components and/or Nyquist frequency components from the outputs of a PCM (56K) modem. The technique is based on convolutional codes. The code is generated through the use of a Viterbi decoder. Data bits are mapped for transmission into a set of n magnitudes and (n–k) sign bits s. The sign bits s are passed through $(H^T)^{-1}$ to get preliminary sing bits $t=s\ (H^T)^{-1}$ of size n. $(H^T)^{-1}$ is a matrix of size (n–k) by n which represents the left inverse of the syndrome-former matrix $H^T$ of convolutional code c=b G, defined so that G $H^T$=0. The convolutional code is then added to sign bits t through an XOR operation to give final sign bits s $(H^T)^{-1}$+b G. After transmission, the final sign bits are passed through $H^T$ to give an output of (s $(H^T)^{-1}$+b G) $(H^T)$)=s, for recovery of the data bits.

12 Claims, 3 Drawing Sheets

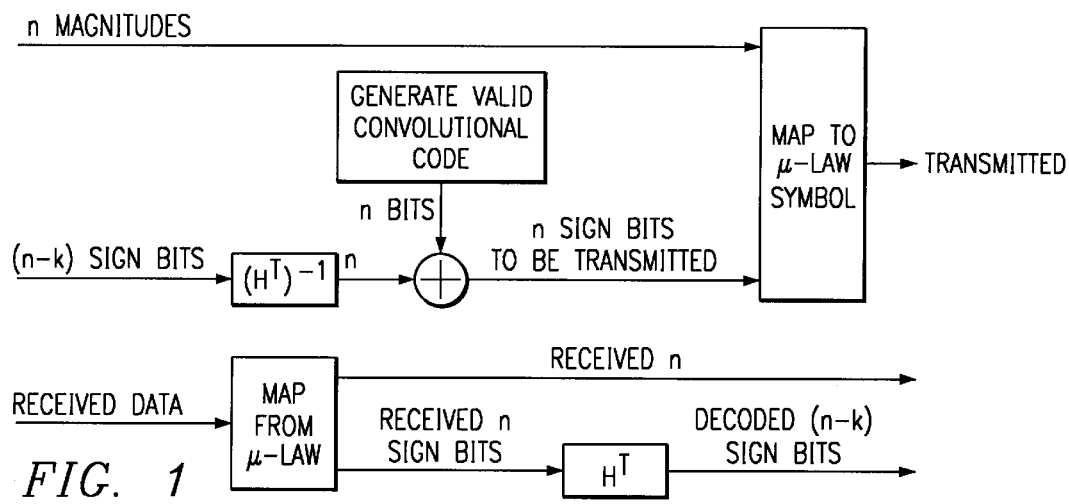
FIG. 1
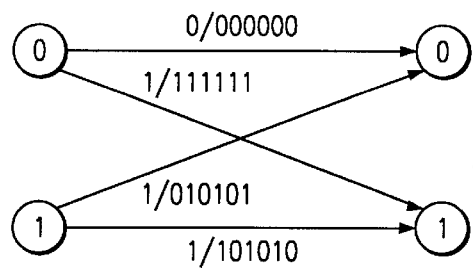
FIG. 2
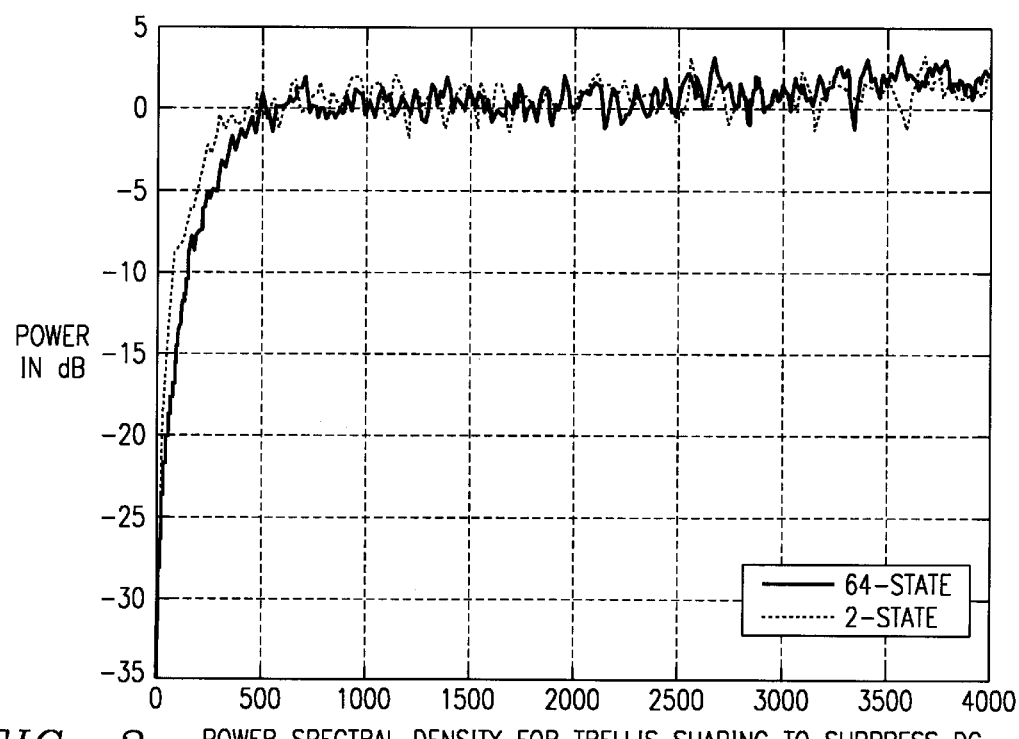
FIG. 3 POWER SPECTRAL DENSITY FOR TRELLIS SHAPING TO SUPPRESS DC POWER SPECTRAL DENSITY (0-500 Hz) FOR TRELLIS SHAPING TO SUPRESS DC

POWER SPECTRAL DENSITY FOR TRELLIS SHAPING TO
SUPPRESS DC AND NYQUIST FREQUENCY

TRELLIS SHAPING FOR PCM MODEMS

This application claims priority under 35 USC §119(e)(1) of provisional application Ser. No. 60/049,312 filed Jun. 11, 1997, the entirety of which is incorporated herein by reference.

This application relates generally to modems and, in particular, to a trellis shaping method for PCM modems.

BACKGROUND OF THE INVENTION

One of the problems in PCM (56K) modems is that the filters at the line cards and the transformers present in the analog portion of the telephone line put a null at DC frequency in the overall response of the channel. The filters at the line card also suppress frequency components around and near the Nyquist frequency (4 kHz for telephone lines). However, the problem is more severe at the DC and low frequencies as the transformers also exhibit non-linearity at such frequencies. These conditions make frequencies near DC and 4 kHz unusable for PCM modems. It is thus necessary to modify the spectrum of the output of the modems to match the channel.

Several proposals have been submitted to date to the TR-30.1 and ITU-T standard committee to modify the output spectrum. One promising submission by Motorola uses a convolutional code. See, Vedat Eyaboglu, "More on Convolutional Spectral Shaping," presented at the V.pcm Rapporteur Meeting, La Jolla, Calif., May, 5–7, 1997, incorporated herein by reference. The code is generated through the use of a Viterbi decoder. The proposal uses a convolutional code with a very simple trellis.

SUMMARY OF THE INVENTION

The invention provides an approach using a more complicated trellis. Experimental results using the novel approach show better performance may be obtained by using properly designed convolutional code. A general structure for use with PCM modems is provided.

BRIEF DESCRIPTION OF THE DRAWINGS

FIG. 1 shows the overall structure of trellis shaping.

FIG. 2 shows a trellis for a first convolutional code in accordance with the invention.

FIG. 3 shows the power spectral densities of output symbols up to 4 kHz for two codes discussed below (cost is the sum of squares of running digital sum).

DETAILED DESCRIPTION

Figure 4:
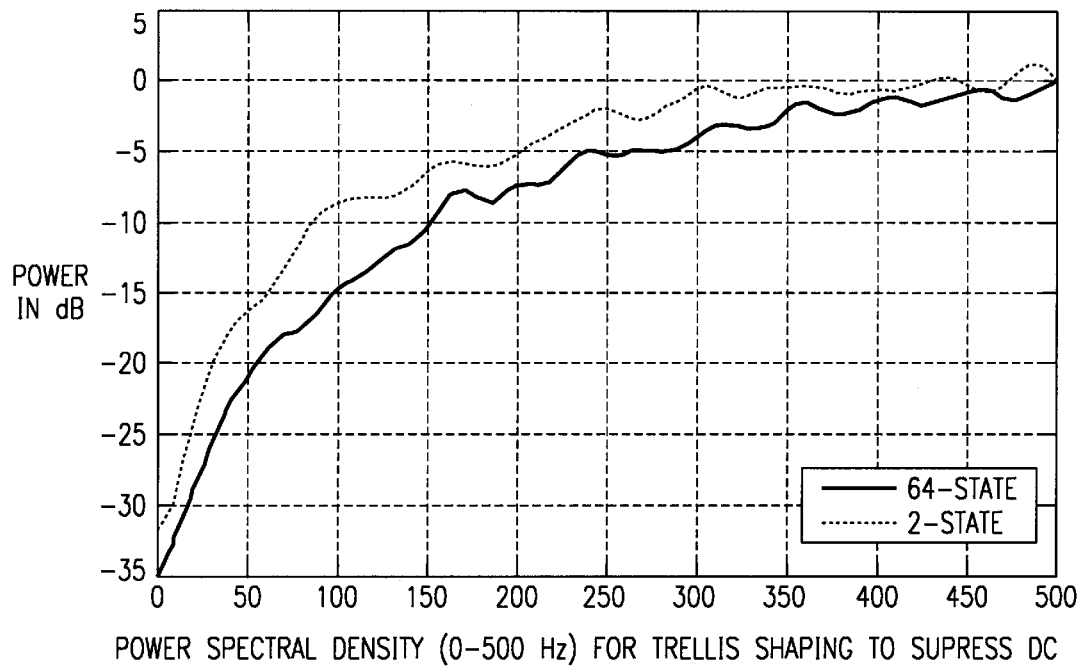
FIG. 4 is an expanded view of the power spectral densities of FIG. 3 up to 500 Hz.

The general structure of the spectral shaping technique based on convolutional codes (also known as trellis shaping) is shown in FIG. 1. (Trellis shaping is discussed in Forney, "Trellis Shaping," IEEE Trans. On Information Theory, Vol. 38, No. 2, pp. 281–300, Mar. 1992, incorporated herein by reference.) The convolutional code is generated through a rate k/n code. This code is represented by a polynomial matrix G (called the generator matrix) of size k by n. For example, the code suggested by Eyaboglu, "More on Convolutional Spectral Shaping," referenced above, can be written as G=[1 1+D 1 1+D 1 1+D](k=1, n=6). Any valid code can be written as c=b G, where b is any binary sequence of length k. The matrix $H^T$ is of size n by (n−k) that represents the syndrome-former of the convolutional code defined in such a way that $GH^T=0$. The left inverse of $H^T$ represented by $(H^T)^{-1}$ has the size (n−k) by n.

The operation of the trellis shaping technique is as follows: In the transmitter side, the incoming bits are mapped into a set of n magnitudes and a set of (n−k) sign bits, s. The (n−k) bits are then passed through $(H^T)^{-1}$ to obtain the preliminary sign bits, $t=s\,(H^T)^{-1}$, of size n. A convolutional code c=b G of size n is added (through an exclusive-OR operation, "XOR") to the preliminary sign bits, t, to obtain the final sign bits. Thus the final signs are given by (s $(H^T)^{-1}$+b G). In the receiver these sign bits are separated and passed through the matrix, $H^T$. The output of this operation gives us (s $(H^T)^{-1}$+b G) $H^T=s$ as $GH^T=0$. Thus the receiver can recover the useful bits that are originally mapped into sign bits.

The choice of the particular convolutional code to be added to the preliminary sign bits is made to minimize some cost functions to obtain the required spectral shaping. In order to minimize the DC content, the following cost functions are useful.

1. The running digital sum (RDS) of PCM symbols up to the end of a frame.

2. The sum of squares of running digital sum at each PCM symbol up to the end of a frame.

The second one provides more suppression and is used in all our simulations. This fact is also noted in Eyaboglu, "More on Convolutional Spectral Shaping," above. In order to obtain suppression of both DC and Nyquist frequency, it is necessary to have a combination of running digital sum and the Nyquist sum in the above. The way to choose the convolutional code need not be known to the receiver, as the only condition the transmitter needs to satisfy is to produce a valid code. In general, however, a Viterbi decoder that minimizes a chosen cost function and produces a valid trellis sequence is a useful way to generate this code. The way the Viterbi decoder is implemented (e.g., the length of Viterbi decoding) is local to the transmitter and the receiver does not need to have any knowledge of this information.

The convolutional code that is used in an implementation of the inventive method can be put in a general form in the following way. The generating matrix is given by:

$$G=[H_1(D)\ H_2(D)\ H_3(D)\ H_4(D)\ H_5(D)\ H_6(D)]. \quad (1)$$

This represents a rate 1/6 code. The syndrome-former for this particular code is represented by the matrix:

$$H^T = \begin{bmatrix} H_6(D) & 0 & 0 & 0 & 0 \\ 0 & H_6(D) & 0 & 0 & 0 \\ 0 & 0 & H_6(D) & 0 & 0 \\ 0 & 0 & 0 & H_6(D) & 0 \\ 0 & 0 & 0 & 0 & H_6(D) \\ H_1(D) & H_2(D) & H_3(D) & H_4(D) & H_5(D) \end{bmatrix}. \quad (2)$$

The left inverse of the above matrix is given by:

$$(H^T)^{-1} = \begin{bmatrix} \frac{1}{H_6(D)} & 0 & 0 & 0 & 0 & 0 \\ 0 & \frac{1}{H_6(D)} & 0 & 0 & 0 & 0 \\ 0 & 0 & \frac{1}{H_6(D)} & 0 & 0 & 0 \\ 0 & 0 & 0 & \frac{1}{H_6(D)} & 0 & 0 \\ 0 & 0 & 0 & 0 & \frac{1}{H_6(D)} & 0 \end{bmatrix} \quad (3)$$

For this ⅙ rate convolutional code, five input sign bits will be mapped into six output sign bits that will be used as signs for the six magnitudes. This corresponds to a frame as defined in a proposal submitted to TR-30.1 standardization meeting. See, Dagdeviren, Eyuboglu and Olafsson, "Draft Text for Downstream Signal Encoding," presented at the V.pcm Rapporteur Meeting, La Jolla, Calif., May 5–7, 1997, incorporated herein by reference.

Simulation Results

In simulation experiments, two different types of convolutional code were used. The first one was that suggested by Eyaboglu, "More on Convolutional Spectral Shaping," above. This code is represented by $$H_1(D) = H_3(D) = H_5(D) = 1, \quad (4)$$

and $$H_2(D) = H_4(D) = H_6(D) = 1 + D.$$

This is a two-state code with a simple trellis shown in FIG. 2.

The second code is given by:

$$H_1(D) = H_3(D) = H_5(D) = 1 + D^3 + D^4 + D^5 + D^6, \quad (5)$$

and $$H_2(D) = H_4(D) = H_6(D) = 1 + D + D^3 + D^4 + D^6.$$

This is a 64-state trellis. Each state has two paths going out of it and two paths coming into it. The commonality between the two codes is that the output codewords for both of them are the same and belong to the following sextuple binary word {000000,111111,010101,101010}.

Figure 5:
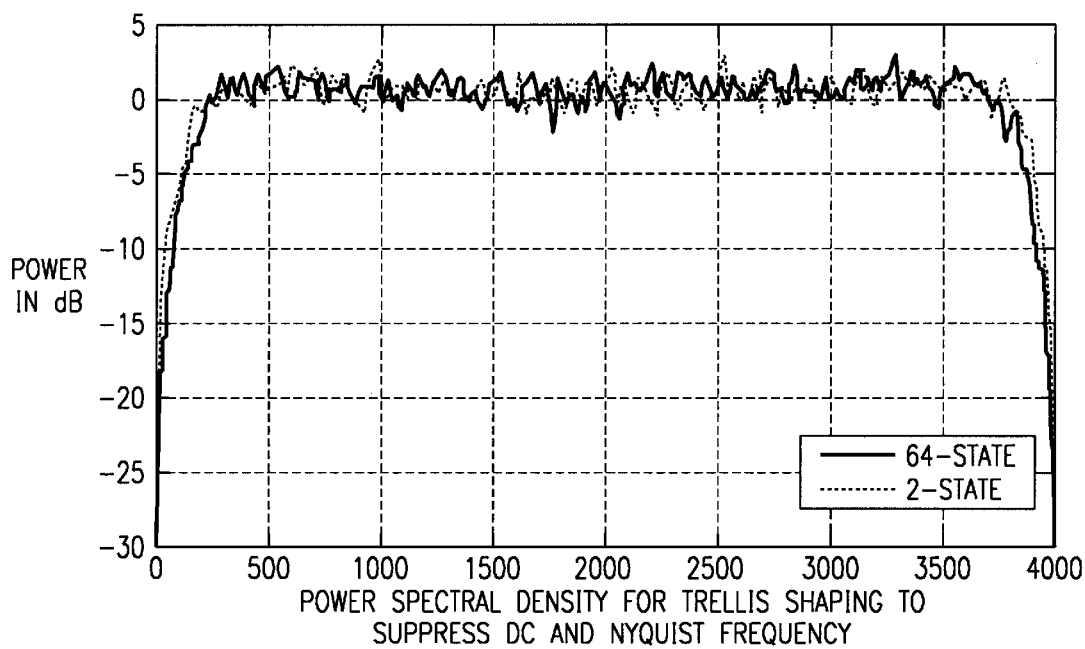
FIG. 5 shows the power spectral densities of output symbols up to 4 kHz for the two convolutional codes discussed below (cost is the sum of squares of running digital sum and Nyquist sum).
Figure 6:
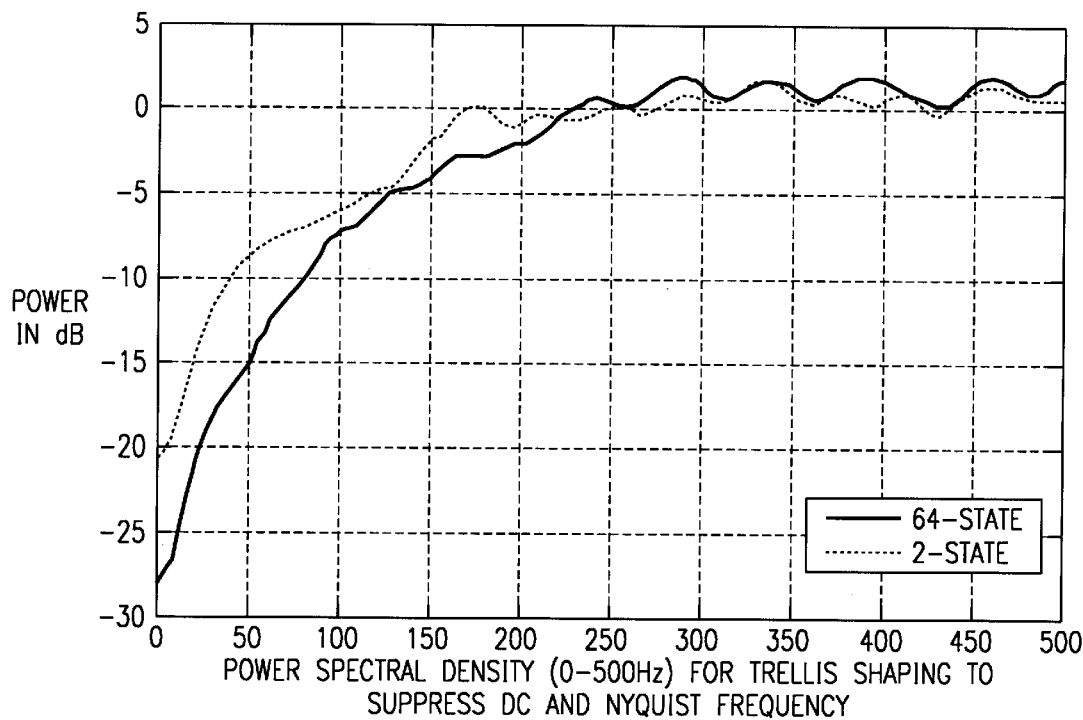
FIG. 6 is an expanded view of the power spectral densities of FIG. 5 up to 500 Hz.
Figure 7:
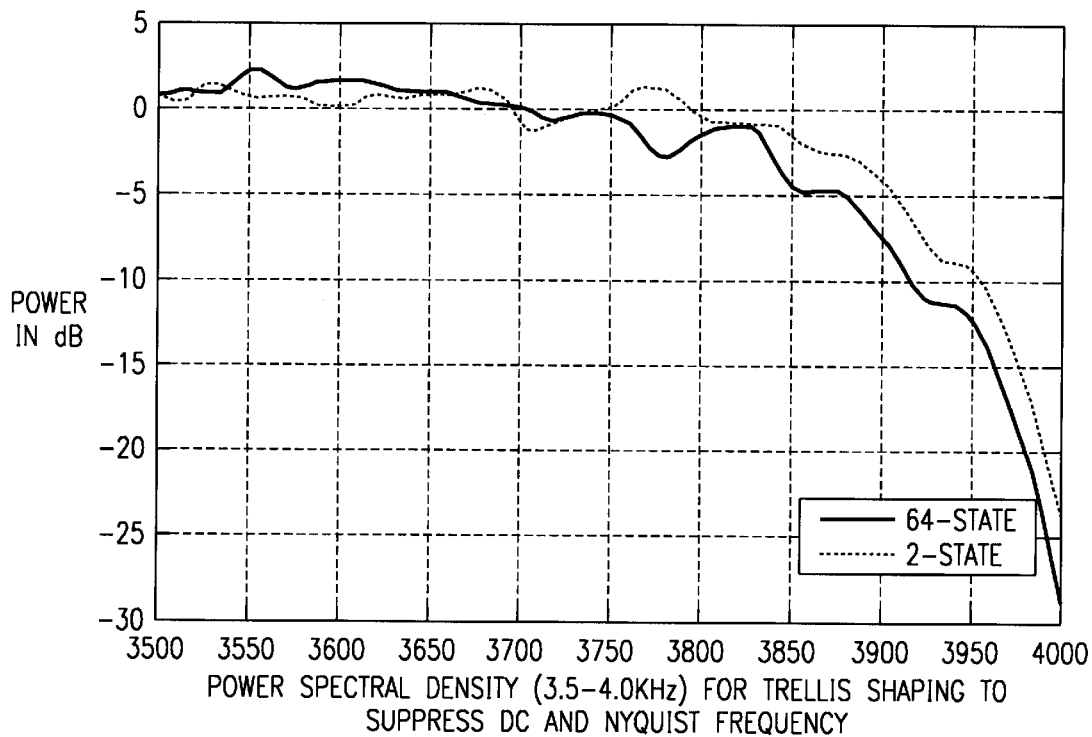
FIG. 7 is an expanded view of the power spectral densities of FIG. 5 from 3.5 to 4.0 kHz.

Results are presented for a constellation of size 128 and with minimum distance between any two points in the constellation being 16. The power level (assuming equal probability distribution of all the levels) is around −12 dBm. FIG. 3 shows the power spectral densities up to 4 kHz of the output symbols for the two convolutional codes given above. FIG. 4 presents an expanded view of these power spectral densities up to 500 Hz. These figures correspond to a cost function that minimizes the DC component only (specifically the squares of the running digital sum at each symbol has been used). FIGS. 5–7 show the power spectral densities for these two codes when both DC and Nyquist frequency suppression are desired. FIG. 5 gives the full 0–4 kHz view whereas FIG. 6 shows frequencies up to 500 Hz and FIG. 7 the frequency range between 3.5 to 4.0kHz.

The illustrations of the previous section clearly show that the 64-state convolutional code yield 5–7 dB better suppression of DC and Nyquist frequency compared with the two-state code. As expected, the suppression is less when both DC and Nyquist frequency are needed to be suppressed compared with the case when only the DC component is suppressed.

The advantage of the 64-state code over the two-state is due to the increased number of states in the trellis. As already mentioned, the output codewords are the same in both the cases. The higher number of states allows more variations in the allowable sequences. For example, in the two-state trellis, neither of the codewords 010101 nor 101010 can follow a 000000. On the other hand, there exists a possibility of having such a sequence in the 64-state convolutional code. This greater number of variations gives more choice to choose the final sequences of codewords that results in better DC and/or Nyquist frequency suppression.

Only a given form of rate ⅙ code was discussed in the examples above. Those skilled in the art to which the invention relates will, however, realize that the same principles can be implemented to have other rates of convolutional codes. Even in the given rate ⅙ coding structure, it is possible to have infinitely many possible choices of codes. By comparing a two-state and a 64-state code with the same output codewords, it has been shown that it is possible to have performance improvement as more complicated convolutional codes are chosen. It may also be possible to design codes with less states and more output codewords in order to provide still better results.

What is claimed is:

1. A trellis shaping method for use in connection with data communication over a communication channel between a transmitter and a receiver, the method comprising:

defining a convolutional code c=b G of size n through a rate k/n code, where b is a binary sequence of length k and G is a variable polynomial code generating matrix G of size k by n;

defining a matrix $H^T$ of size n by (n−k) which represents the syndrome-former of the convolutional code defined so that G $H^T$=0;

defining a matrix $(H^T)^{-1}$ of size (n−k) by n which represents the left inverse of $H^T$;

at the transmitter:

mapping digital data bits into a set of n magnitudes and a set of (n−k) sign bits s;

passing the (n−k) sign bits through $(H^T)^{-1}$ to obtain preliminary sign bits t=s $(H^T)^{-1}$ of size n; and adding the convolutional code c=b G, through an exclusive OR operation, to the preliminary sign bits t to obtain final sign bits given by s $(H^T)^{-1}$+b G.

2. The method of claim 1, wherein the convolutional code is defined as a rate ⅙ code having a generating matrix given by:

$$G = [H_1(D) H_2(D) H_3(D) H_4(D) H_5(D) H_6(D)].$$

3. The method of claim 2, wherein the convolutional code is a code further defined by:

$$H_1(D) = H_2(D) = H_3(D) = 1,$$

and $$H_4(D) = H_5(D) = H_6(D) = 1 + D.$$

4. The method of claim 3, wherein the convolutional code is a code further defined by:

$$H_1(D) = H_3(D) = H_5(D) = 1 + D^3 + D^4 + D^5 + D^6,$$

and $$H_2(D) = H_4(D) = H_6(D) = 1 + D + D^3 + D^4 + D^6.$$

5. The method of claim 1, further comprising:
separating the final sign bits and passing them through the matrix $H^T$ to give an output of $(s\,(H^T)^{-1}+b\,G)\,(H^T)=s$, to recover the digital data bits.

6. The method of claim 5, wherein the convolutional code is defined as a rate 1/6 code having a generating matrix given by:

$$G=[H_1(D)H_2(D)H_3(D)H_4(D)H_5(D)H_6(D)].$$

7. The method of claim 6, wherein the convolutional code is a code further defined by:

$$H_1(D)=H_2(D)=H_3(D)=1,$$

and $$H_4(D)=H_5(D)=H_6(D)=1+D.$$

$$H_4(D)=H_5(D)=H_6(D)=1+D.$$

8. The method of claim 6, wherein the convolutional code is a code further defined by:

$$H_1(D)=H_3(D)=H_5(D)=1+D^3+D^4+D^5+D^6,$$

and $$H_2(D)=H_4(D)=H_6(D)=1+D+D^3+D^4+D^6.$$

9. A trellis shaping method for data communication over a telephone line between a PCM modem transmitter and a PCM modem receiver, the method comprising:
defining a convolutional code $c=b\,G$ of size n through a rate k/n code, where b is a binary sequence of length k and G is a polynomial code generating matrix G of size k by n;
defining a matrix $H^T$ of size n by (n−k) which represents the syndrome-former of the convolutional code defined so that $G\,H^T=0$;
defining a matrix $(H^T)^{-1}$ of size (n−k) by n which represents the left inverse of $H^T$;
at the PCM modem transmitter:
mapping digital data bits into a set of n magnitudes and a set of (n−k) sign bits s;
passing the (n−k) sign bits through $(H^T)^{-1}$ to obtain preliminary sign bits $t=s\,(H^T)^{-1}$ of size n; and
adding the convolutional code $c=b\,G$, through an exclusive OR operation, to the preliminary sign bits t to obtain final sign bits given by $s\,(H^T)^{-1}+b\,G$;
and at the PCM modem receiver:
separating the final sign bits and passing them through the matrix $H^T$ to give an output of $(s\,(H^T)^{-1}+b\,G)\,(H^T)=s$, to recover the digital data bits.

10. The method of claim 9, wherein the convolutional code is defined as a rate 1/6 code having a generating matrix given by:

$$G=[H_1(D)\ H_2(D)\ H_3(D)\ H_4(D)\ H_5(D)\ H_6(D)].$$

11. The method of claim 10, wherein the convolutional code is a code further defined by:

$$H_1(D)=H_2(D)=H_3(D)=1,$$

and $$H_4(D)=H_5(D)=H_6(D)=1+D.$$

12. The method claim 10, wherein the convolutional code is a code further defined by:

$$H_1(D)=H_3(D)=H_5(D)=1+D^3+D^4+D_5+D^6,$$

and $$H_2(D)=H_4(D)=H_6(D)=1+D+D^3+D_4+D^6.$$

* * * * *